United States Patent
Gao et al.

(10) Patent No.: US 8,924,791 B2
(45) Date of Patent: Dec. 30, 2014

(54) SYSTEM INCLUDING A VENDOR COMPUTER SYSTEM FOR TESTING SOFTWARE PRODUCTS IN A CLOUD NETWORK

(75) Inventors: Yu Gao, Shanghai (CN); Yuan-Chun Liao, Shanghai (CN); Jing-bo Huang, Shanghai (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 518 days.

(21) Appl. No.: 12/871,582

(22) Filed: Aug. 30, 2010

(65) Prior Publication Data

US 2012/0054551 A1    Mar. 1, 2012

(51) Int. Cl.
*G06F 11/00* (2006.01)
*G06F 11/36* (2006.01)

(52) U.S. Cl.
CPC ................... *G06F 11/3664* (2013.01)
USPC ....................................................... 714/38.14

(58) Field of Classification Search
CPC ............ G06F 11/3664; G06F 11/3676; G06F 11/3688; G06F 11/3684; G06F 11/3636; G06F 11/3672
USPC ............................................... 714/38.1, 38.14
See application file for complete search history.

(56) References Cited

U.S. PATENT DOCUMENTS

| | | | |
|---|---|---|---|
| 7,533,312 B2* | 5/2009 | Janes | 714/724 |
| 8,191,044 B1* | 5/2012 | Berlik et al. | 717/124 |
| 2004/0128653 A1* | 7/2004 | Arcand | 717/124 |
| 2005/0050546 A1* | 3/2005 | Remany et al. | 718/105 |
| 2007/0044078 A1 | 2/2007 | Cifra | |
| 2008/0010535 A1* | 1/2008 | Dasgupta | 714/38 |
| 2009/0300423 A1* | 12/2009 | Ferris | 714/38 |
| 2010/0218035 A1* | 8/2010 | Avizienis | 714/4 |
| 2012/0060142 A1* | 3/2012 | Fliess et al. | 717/102 |

* cited by examiner

*Primary Examiner* — Yair Leibovich
(74) *Attorney, Agent, or Firm* — Dicke, Billig & Czaja, PLLC; Patirck G. Billig

(57) ABSTRACT

A system including a vendor computer system. The vendor computer includes a test controller and a resource controller. The test controller is configured to provide a central access point to the vendor computer system and to manage test cases. The resource controller is configured to control testing of software products. The resource controller allocates cloud resources in a cloud network to test the software products via the test case.

20 Claims, 6 Drawing Sheets

| | DEPLOYMENT TIME (MIN) | EXECUTION TIME (MIN) | COVERAGE | | |
|---|---|---|---|---|---|
| | | | OS (%) | BROWSER (%) | DATA BASE (%) |
| SERIAL TESTING | 120 | 300 | 33 1/3 | 50 | 25 |
| TaaS TESTING | 30 | 75 | 100 | 100 | 100 |

Fig. 7

SYSTEM INCLUDING A VENDOR COMPUTER SYSTEM FOR TESTING SOFTWARE PRODUCTS IN A CLOUD NETWORK

BACKGROUND

Typically, software developers and testers test software products before releasing the products to the marketplace. Often, the software products are built to run on a number of platforms including different operating systems, product supported browsers, middleware, and databases.

Some vendors have built test frameworks for testing software products, where the test frameworks are for the common use of the developers and testers. These test frameworks can include test scripts or cases and support functions to execute the test cases. To test the software products, the software developers and testers become web-clients or customers of a vendor. Often, the developers and testers spend a great deal of time on the deployment of testing environments, where a testing environment includes a runtime environment and a product environment. Also, the average serial execution time for a bundle of test cases can be very long.

Bottlenecks in the test frameworks include the long serial execution time for a bundle of test cases, low efficiencies in the deployment of the testing environments, low platform coverage, and the lack of test case quality control that results in poor quality test cases that can jeopardize testing stability, reliability, and maintainability.

Long serial execution times make it impossible for developers and testers to make in-time judgments about the impact of changes. Currently, it can take many hours to respond to a customer with the latest test results for a software product. Also, neither developers nor testers can guarantee testing performance after an increase in test coverage.

Low efficiencies in the deployment of the testing environments are related to each user building at least one independent testing environment. Moreover, discrepancies between testing platforms and market platforms often result in testing environment redeployments, which cause repetitive efforts and low productivity.

Low platform coverage includes a tester executing and obtaining results on a single platform, where the software products are expected to work well on a number of platforms.

For these and other reasons there is a need for the present invention.

BRIEF DESCRIPTION OF THE DRAWINGS

FIG. 7 is a chart illustrating the advantages of one embodiment of the system of FIG. 1.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
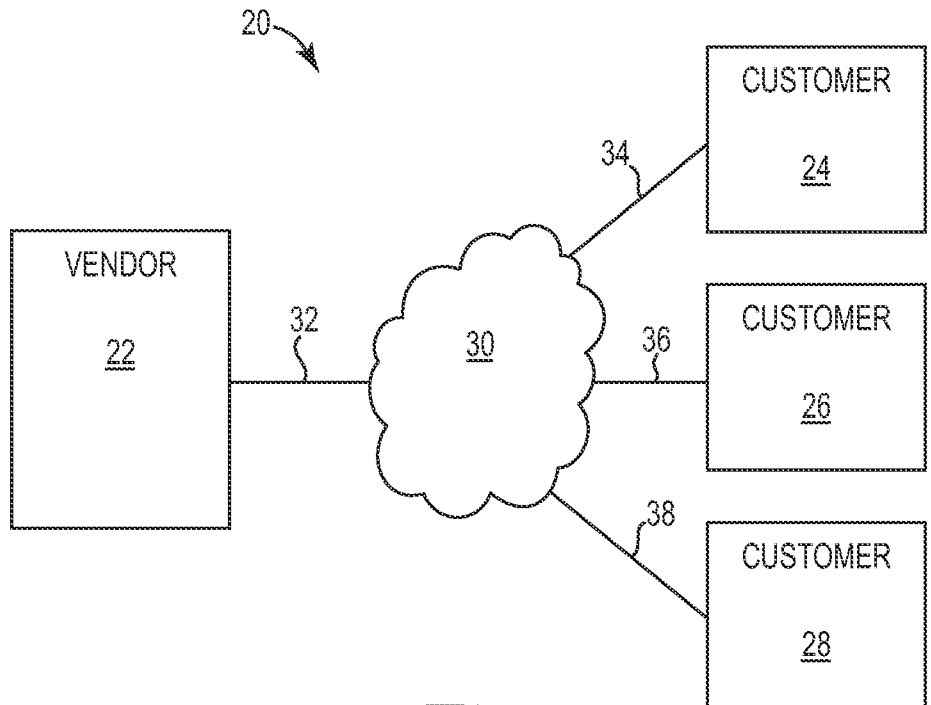
FIG. 1 is a diagram illustrating one embodiment of a system that includes a vendor computer system and customer computer systems.

FIG. 1 is a diagram illustrating one embodiment of a system 20 that includes a vendor computer system 22 and customer computer systems 24, 26, and 28. Vendor computer system 22 is communicatively coupled to a network 30, such as the Internet or World Wide Web, via communications path 32. Customer computer systems 24, 26, and 28 are communicatively coupled to the network 30 via communication paths 34, 36, and 38, respectively. Vendor computer system 22 and customer computer systems 24, 26, and 28 communicate via the network 30. In other embodiments, system 20 includes any suitable number of customer computer systems, such as one or more customer computer systems.

System 20 provides testing as a service (TaaS) to customers, where TaaS is a service-oriented automation system for meeting the software product testing needs of web-customers. Vendor computer system 22 represents a vendor computing environment and each of the customer computer systems 24, 26, and 28 represents a customer computing environment. The software products are tested in the vendor computing environment.

Vendor computer system 22 includes a test controller and a resource controller. The test controller provides a central access point to vendor computer system 22 and it manages test cases. Customers access vendor computer system 22 via the central access point using a browser, such as an Internet browser. In one embodiment, the test controller provides access control to the vendor computer system 22 and the test cases. In one embodiment, the test controller includes an access control function, such as a login function including user identification and a password.

Customers write and edit test cases in the test controller for testing software products. Customers can bundle test cases into test suites and store the test cases and the test suites in a case repository. Also, the test controller includes a wiki function that supports rating and commenting on the test cases, where higher rated test cases are stored in a knowledge base. Multiple users, such as multiple users in a working group, can be given access to the same test cases for using, rating and commenting on the test cases. These users may also be given access to edit the test cases. The wiki function provides a mechanism to developers and testers for contributing ideas, which results in higher quality test cases.

The resource controller controls testing of software products using virtualization techniques. The resource controller allocates cloud resources, such as virtual machines, in a cloud network to test the software products using the test cases. In one embodiment, the resource controller dynamically allocates virtual machines based on the number of test cases to be executed. In one embodiment, the resource controller dynamically allocates virtual machines based on the number of test cases to be executed and the number of virtual machines available.

A cloud network refers to a communications network combined with a cloud computing infrastructure. The cloud network can be any local area network (LAN) or wide area network (WAN), including the internet. Cloud computing refers to on-demand services offered to users via the cloud network. Cloud computing can include provisions for virtualized resources and dynamically scaling virtualized resources, which are accessible via web services or software, such as a web browser. While software and data are stored in servers inside the network, the details are invisible to the user. Cloud computing infrastructures include services delivered through common centers and built on servers. The resource controller deploys one or more testing environments to one or more virtual machines in the cloud network. Also, the resource controller deploys multiple testing environments in parallel, and if the customer wants to test the software product on multiple platforms, the resource controller deploys different testing environments to at least two of the virtual machines in the cloud network. Test cases are divided among virtual machines to test the software product in parallel, as opposed to serial testing.

Testing software products in parallel using virtual machines reduces test execution time. Also, deploying multiple testing environments in parallel reduces deployment time, and deploying different testing environments expands platform coverage. In addition, the wiki function improves the quality of test cases.

In system 20, a customer can purchase a subscription or pay for testing on a per unit basis. In one embodiment, a customer pays for testing based on units, such as test time or number of tests. In one embodiment, customers subscribe to TaaS for time periods, such as 90 days, yearly, or more than one year.

Figure 2:
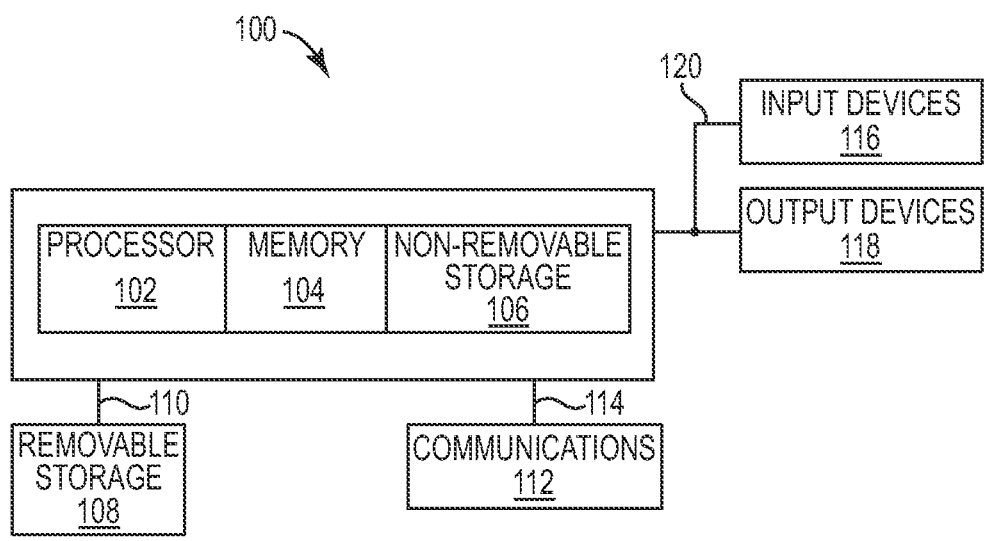
FIG. 2 is a diagram illustrating one embodiment of a computer system that can be employed in the system of FIG. 1.

FIG. 2 is a diagram illustrating one embodiment of a computer system 100 that can be employed in system 20. Computer system 100 includes physical computing components and may include virtual machines. In one embodiment, vendor computer system 22 is the same as or similar to computer system 100. In one embodiment, one or more of the customer computer systems 24, 26, and 28 is the same as or similar to computer system 100. Computer system 100 includes a processor architecture including at least one processing unit, i.e., processor 102, and memory 104. Memory 104 is volatile memory, non-volatile memory, or some combination of the two. In one embodiment, memory 104 is arranged in a memory hierarchy, such as a cache.

Computer system 100 includes additional storage including non-removable storage 106 and removable storage 108. This additional storage is non-transitory computer readable storage media or non-transitory computer readable media, which includes devices such as magnetic disks, optical disks, solid state memory, and/or flash memory storage devices. Processor 102 communicates with memory 104 and non-removable storage 106 and is communicatively coupled to removable storage 108 via storage path 110. The additional storage stores information such as computer readable instructions, data structures, program modules, and/or other data.

Computer system 100 is configured to run an operating system software program that can be stored on the storage media along with one or more software applications, which make up a system platform. Memory 104, non-removable storage 106, and removable storage 108 are all examples of computer storage media that can be used to store the desired information. Computer system 100 also includes one or more communication connections 112 communicatively coupled to processor 102 via communications path 114. The communication connections 112 allow computer system 100 to communicate with other computers/applications that can be used to store desired information and accessed by computer system 100.

User interface components of computer system 100 include one or more input devices 116, such as a keyboard, a pointing device (e.g., mouse), a voice input device, and/or a touch input device, and one or more output devices 118, such as a display and/or a printer. Input devices 116 and output devices 118 are communicatively coupled to processor 102 via input/output path 120.

Figure 3:
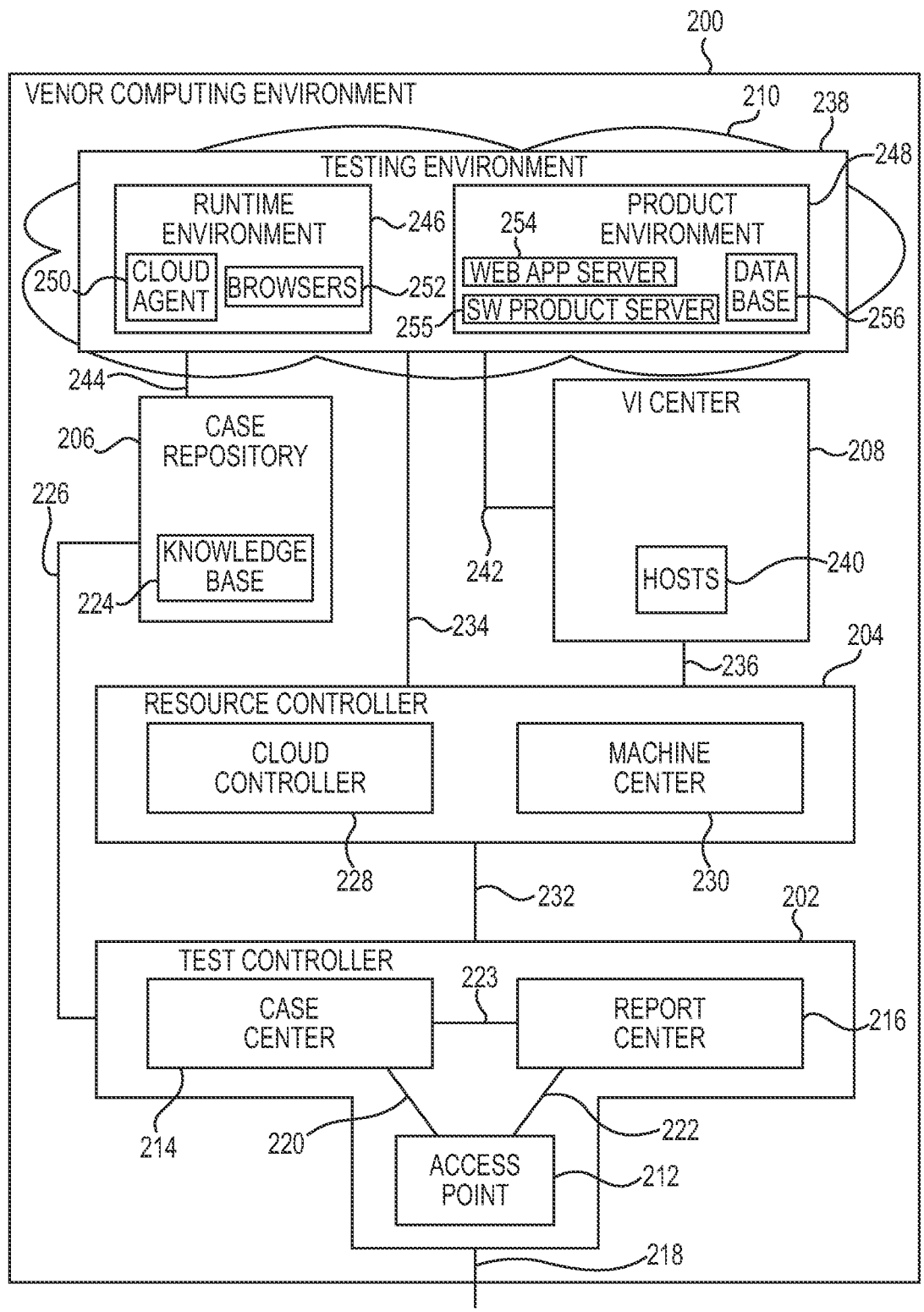
FIG. 3 is a diagram illustrating one embodiment of a vendor computing environment in a vendor computer system.

FIG. 3 is a diagram illustrating one embodiment of a vendor computing environment 200 in a vendor computer system, such as vendor computer system 22 (shown in FIG. 1). Vendor computing environment 200 provides TaaS to web-customers, where customer software products are tested in vendor computing environment 200. Vendor computing environment 200 includes a test controller 202, a resource controller 204, a case repository 206, a virtual infrastructure (VI) center 208, and a cloud network 210.

Test controller 202 includes a central access point 212, a case center 214, and a report center 216. Access point 212 is communicatively coupled to a network, such as network 30 (shown in FIG. 1), via network communications path 218. Also, access point 212 is communicatively coupled to case center 214 via case path 220 and to report center 216 via report path 222. Case center 214 is communicatively coupled to report center 216 via data path 223. Customers gain access to vendor computing environment 200 via central access point 212 over network communications path 218 using a browser, such as an Internet browser. If access point 212 includes an access control function, each customer has access to their own user profile and test cases via a login, where different users from the same customer have access to the same profile and test cases using the same login. In one embodiment, access point 212 includes an access control function, where user access to vendor computing environment 200 is controlled via a login function including a customer identification element, such as a user identification name/number and a password. In one embodiment, access point 212 includes an access control function, where multiple users, such as users in a working group, have access to at least some of the same test cases or groups of test cases. In one embodiment, access point 212 includes an access control function, where multiple users have access to at least some of the same test cases or groups of test cases and different levels of access are assigned to different users for performing functions, such as testing software products using one or more test cases, editing test cases, rating test cases, and commenting on test cases.

Customers gain access to case center 214 via access point 212 using a browser. Test controller 202 and case center 214 manage the test cases and are communicatively coupled to case repository 206, which includes knowledge base 224, via repository communications path 226. Customers write test cases, edit test cases, and bundle test cases into test suites using case center 214. Customers also manage and control which users manage the test cases and which users have access to test cases including the level of access to test cases via case center 214. Different levels of access include managing test cases, testing software products using one or more test cases, editing test cases, rating test cases, and commenting on test cases. Case center 214 stores test cases and test suites in case repository 206.

Test controller 202 and case center 214 include the wiki function that supports rating test cases and commenting on test cases. Customers use the test cases to test software products and based on experience with a test case, customers rate the test case and/or comment on the test case. If the test case is a good quality test case, case center 214 stores the test case in case repository 206 and the test case is available for use. If the test case is a high quality test case, case center 214 stores the test case in knowledge base 224. Users have access to high quality test cases in knowledge base 224. In one embodiment, case center 214 stores the good test cases with the ratings and comments in case repository 206. In one embodiment, case center 214 stores the high quality test cases with the ratings and comments in knowledge base 224. In one embodiment, a first rating threshold is used to determine good test cases and a second, higher, rating threshold is used to determine higher quality test cases.

Report center 216 collects information on test cases stored in case repository 206 and report center 216 collects information on test cases from case center 214 and provides matrices or reports to reviewers. Report center 216 collects information, such as ratings and comments on test cases, test coverage information, number of successful tests, number of exceptions, number of failures, percentage of successful tests, percentage of exceptions, and percentage of failures. Customers can access report center 216 via access point 212 using a browser. In one embodiment, report center 216 automatically produces reports and sends the reports to customers and/or reviewers via network communications path 218.

Resource controller 204 controls the computing capability of vendor computing environment 200, including the testing of software products using virtualization techniques. Resource controller 204 includes cloud controller 228 and machine center 230. Cloud controller 228 and machine center 230 operate together to provide virtual and physical control functions in vendor computing environment 200. Resource controller 204 is communicatively coupled to test controller 202 via controller communications path 232. Also, resource controller 204 is communicatively coupled to cloud network 210 via cloud communications path 234 and to VI center 208 via infrastructure communications path 236.

Cloud network 210 is a communications network combined with a cloud computing infrastructure. Cloud network 210 can be any local area network (LAN) or wide area network (WAN), including the internet. While software and data are stored in servers in the cloud network 210, the details are invisible to the user. Cloud computing infrastructures include services delivered through common centers and built on the servers.

Cloud controller 228 manages cloud resources in cloud network 210 for testing software products via test cases in case repository 206. Cloud controller 228 allocates cloud resources, including virtual machines, in cloud network 210. Also, cloud controller 228 deploys testing environments, such as testing environment 238, into virtual machine cloud units of cloud network 210. Different testing environments are deployed according to customer demands/requests. After running test cases on the software product, resource controller 204 cleans up the testing environment and either deletes the testing environment or saves the testing environment as a template in resource controller 204. In one embodiment, cloud controller 228 deploys testing environment templates that are stored in resource controller 204, which reduces the time to deploy a number of different testing environments.

Machine center 230 provides the physical control ability to cloud controller 228. VI center 208 includes host machines 240 and cloud network 210 is on the host machines 240, where cloud network 210 includes virtual machines in cloud units. VI center 208 is communicatively coupled to cloud network via cloud/host path 242. Machine center 230 envelopes VI center 208 and physically controls host machines 240 in VI center 208. Also, machine center 230 provides physical level control for controlling the virtual machines in cloud network 210. In one embodiment, host machines 240 in VI center 208 use ESX host technology.

Cloud controller 228 and machine center 230 dynamically balance test cases to different virtual machines to save on execution time. In a load analysis, cloud controller 228 checks for available cloud resources in the cloud network resource pool, and cloud controller 228 checks the number of test cases that the customer wants to execute. In one embodiment, if the number of test cases is below a threshold value, such as 100 test cases, cloud controller 228 allocates one virtual machine or cloud unit for testing, and if the number of test cases is above the threshold value cloud controller 228 allocates multiple virtual machines or cloud units for testing. In other embodiments, cloud controller 228 dynamically allocates virtual machines based on the number of test cases to be executed and the number of virtual machines available or cloud controller 228 dynamically allocates virtual machines based on the number of test cases to be executed, the number of virtual machines available, and how long the customer can wait for test results.

In one embodiment, a queuing system is used for load balancing. Cloud controller 228 includes a messaging queue. Cloud controller 228 collects all of the test cases to be executed and stores them in a messaging queue instance, referred to as a test case queue. Next, each of the deployed virtual machine cloud units retrieves the next test case in the test case queue, one-by-one, and returns test results into another messaging queue instance, referred to as a test result queue. This process continues until all test cases in the test case queue have been tested. Load balancing is accomplished via the queuing system.

Cloud controller 228 deploys at least one testing environment, such as testing environment 238, to each allocated virtual machine cloud unit in cloud network 210. Cloud controller 228 deploys multiple testing environments in parallel to different cloud units. Also, if the customer wants to test the software product on multiple platforms, cloud controller 228 deploys different testing environments to at least two of the virtual machines in cloud network 210. Cloud controller 228 and machine center 230 dynamically balance the test cases to different virtual machines, where test cases are divided among virtual machines and the software product is tested in parallel, as opposed to serially, to save on execution time. Testing software products in parallel using virtual machines reduces test execution time. Also, deploying multiple testing environments in parallel reduces deployment time, and deploying different testing environments expands platform coverage. In addition, the wiki function improves the quality of test cases. In one embodiment, vendor computing environment 200 including resource controller 204 is backward compatible such that vendor computing environment 200 can run one test case at a time and previously built test cases.

Testing environment 238 represents one of the testing environments deployed in cloud network 210. Testing environment 238 is communicatively coupled to case repository 206 via test case path 244 and to resource controller 204 via cloud communications path 234. Testing environment 238 is in a virtual machine cloud unit in cloud network 210, where the virtual machine cloud unit is on one of the host machines 240 in VI center 208.

Testing environment 238 includes a runtime environment 246 and a product environment 248. Runtime environment 246 includes a cloud agent 250 and browsers 252. Cloud agent 250 copies test cases from case repository 206, including knowledge base 224, for testing the software product.

Product environment 248 includes a web application server 254, a software product server 255, and database 256. Resource controller 204 controls the testing of software products in testing environment 238. In other embodiments, database 256 is part of the web application server 254 and/or the software product server 255.

In operation, customers access vendor computing environment 200 via central access point 212 using a browser. Customers write test cases, edit test cases, and bundle test cases into test suites using case center 214. Customers also manage and control which users manage the test cases and which users have access to test cases including the level of access to test cases. Customers use the test cases to test one or more software products on one or more platforms.

Cloud controller 228 allocates cloud resources, including virtual machines, in cloud network 210. Cloud controller 228 deploys at least one testing environment, such as testing environment 238, to each allocated virtual machine cloud unit in cloud network 210. Cloud controller 228 can deploy multiple testing environments in parallel to different cloud units. Also, if the customer wants to test the software product on multiple platforms, cloud controller 228 deploys different testing environments to at least two of the virtual machines in cloud network 210. Machine center 230 provides the physical control ability to cloud controller 228. Cloud controller 228 and machine center 230 dynamically balance test cases to different virtual machines, where test cases are divided among virtual machines and the software product is tested in parallel, as opposed to serially.

Based on experience with a test case, customers rate the test case and/or comment on the test case. If the test case is a good quality test case, case center 214 stores the test case in case repository 206. If the test case is a high quality test case, case center 214 stores the test case in knowledge base 224. Report center 216 collects information on test cases stored in case repository 206 and report center 216 collects information on test cases from case center 214 and provides matrices or reports to reviewers.

Figure 4:
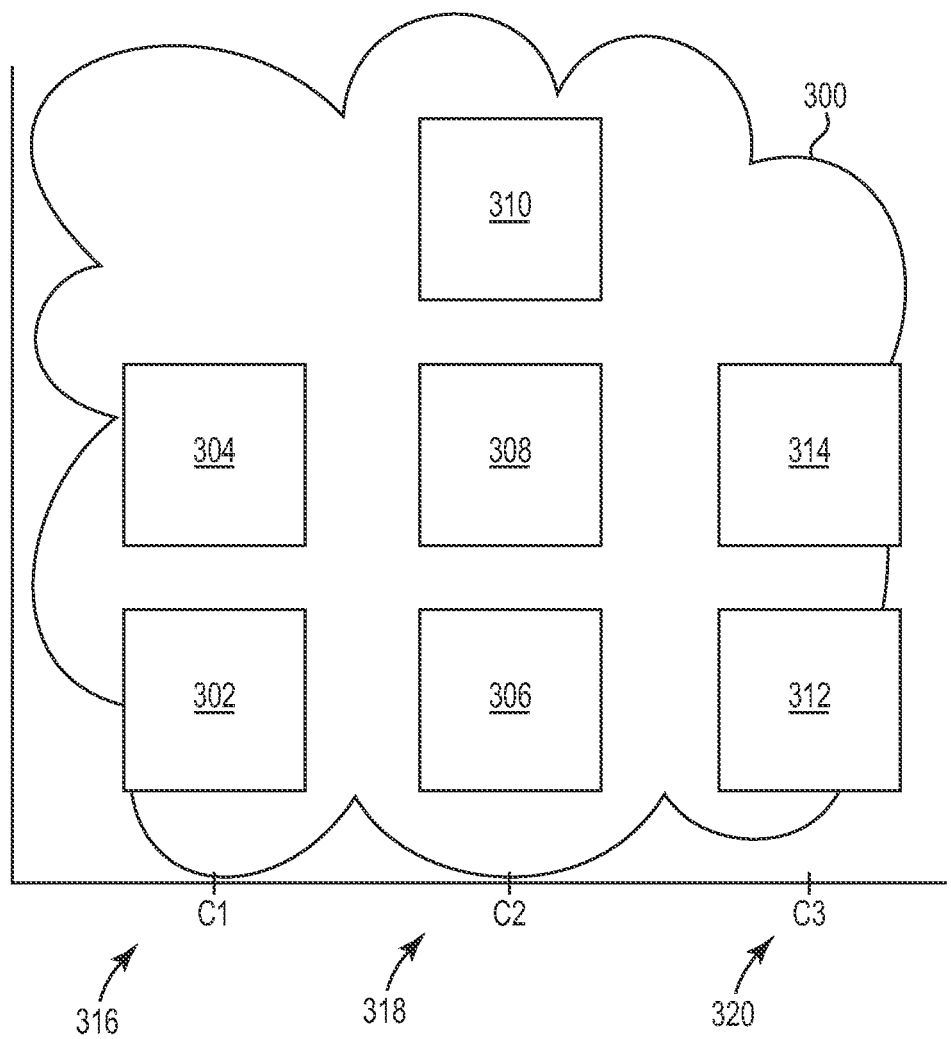
FIG. 4 is a diagram illustrating one embodiment of a cloud network in a vendor computing environment.

FIG. 4 is a diagram illustrating one embodiment of a cloud network 300 in a vendor computing environment, such as cloud network 210 in vendor computing environment 200. Cloud network 300 includes seven virtual machine cloud units 302, 304, 306, 308, 310, 312, and 314. Each of the virtual machine cloud units 302 and 304 in column 1 at 316 provide a 32-bit Windows platform. Each of the virtual machine cloud units 306, 308, and 310 in column 2 at 318 provide a 64-bit Windows platform. Each of the virtual machine cloud units 312 and 314 in column 3 at 320 provide a Linux platform.

A resource controller, such as resource controller 204, dynamically balances test cases to different virtual machine cloud units. Test cases for the 32-bit Window platform are divided among virtual machine cloud units 302 and 304. Test cases for the 64-bit Window platform are divided among virtual machine cloud units 306, 308, and 310. Test cases for the Linux platform are divided among virtual machine cloud units 312 and 314. The software product is tested on each of the three platforms at the same time and in parallel on each platform. This reduces test execution time with increased platform coverage.

In one embodiment, each of the virtual machine cloud units 302, 304, 306, 308, 310, 312, and 314 includes: a target release value, which is the version of the end software product being tested; a server endpoint value, which is the operating system platform; a client endpoint, which is the browser used; and an application server endpoint, which is the application server.

Figure 5:
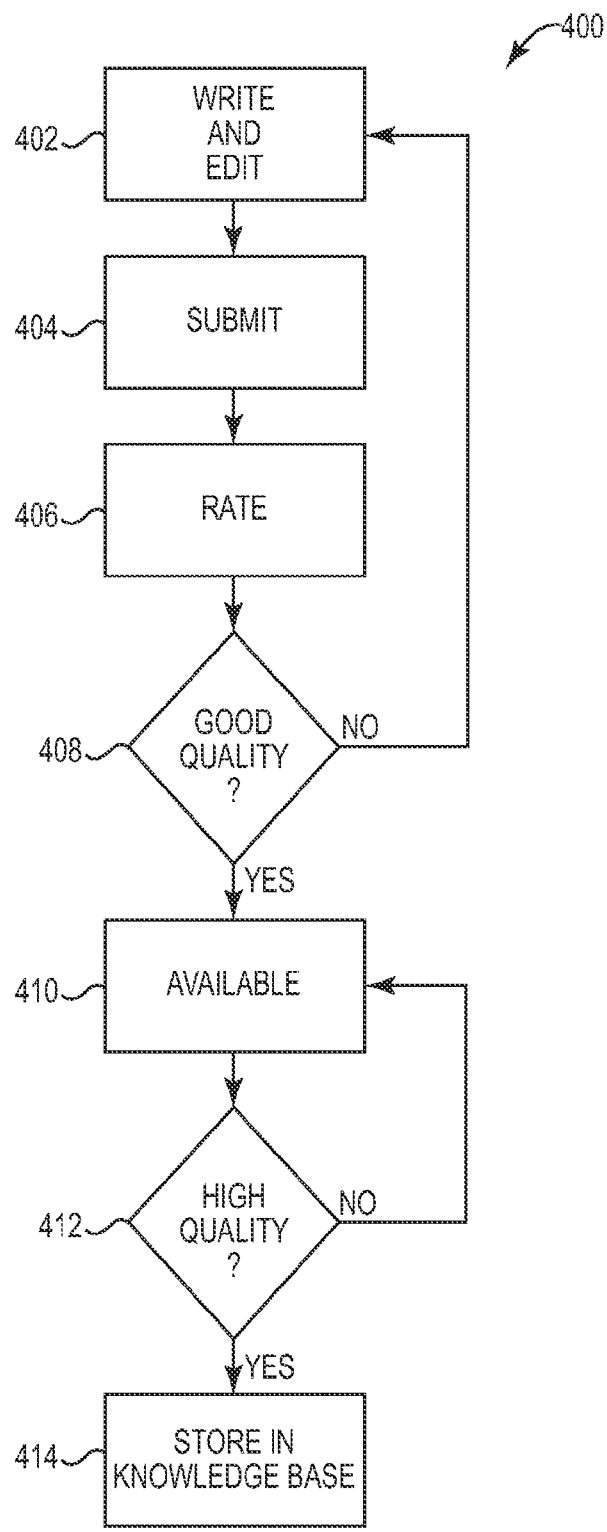
FIG. 5 is a flow chart diagram illustrating one embodiment of the wiki function that supports rating and commenting on test cases.

FIG. 5 is a flowchart diagram illustrating one embodiment of the wiki function 400 that supports rating and commenting on test cases in vendor computing environment 200. At 402, customers gain access to case center 214 via access point 212 and write and edit test cases. Also, customers bundle test cases into test suites and manage which users manage the test cases and which users have access to test cases, including the level of access to test cases. At 404, the test cases are submitted for testing a software product.

In one embodiment, case center 214 stores the test cases and test suites in case repository 206. In one embodiment, case center 214 stores all of the test cases and test suites in case repository 206, but only the good quality test cases are available for executing.

At 406, users use the test cases to test software products and based on experience with a test case, users rate the test case and/or comment on the test case. At 408, if the test case is not a good quality test case, users edit the test case at 402 and resubmit the test case for testing at 404. If the test case is a good quality test case at 408, case center 214 stores the test case in case repository 206 and the test case is available for use at 410 as a good quality test case. In one embodiment, case center 214 stores the good quality test cases with the ratings and comments in case repository 206.

At 412, if the test case is not a high quality test case, the test case remains available at 410 in case repository 206. If the test case is a high quality test case at 412, case center 214 stores the test case in knowledge base 224, where users have access to high quality test cases in knowledge base 224. In one embodiment, case center 214 stores the high quality test cases with the ratings and comments in knowledge base 224. In one embodiment, a first rating threshold is used to determine good test cases and a second, higher, rating threshold is used to determine higher quality test cases.

Figure 6:
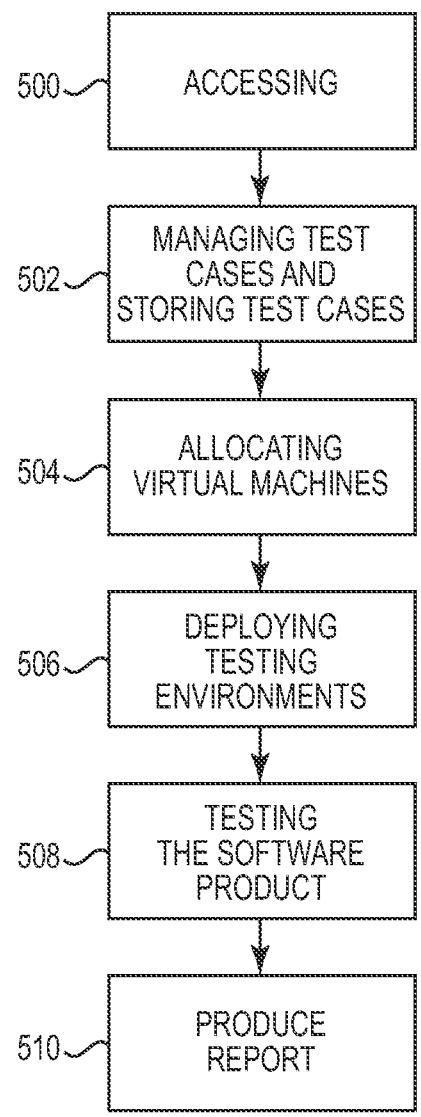
FIG. 6 is a flow chart diagram illustrating the operation of one embodiment of a vendor computing environment.

FIG. 6 is a flowchart diagram illustrating the operation of one embodiment of vendor computing environment 200. At 500, customers access vendor computing environment 200 via central access point 212. At 502, customers use the wiki function, such as wiki function 400 of FIG. 5, to manage and store test cases. Customers write test cases, edit test cases, and bundle test cases into test suites using case center 214. Customers also manage which users manage test cases and which users have access to test cases, including the level of access to test cases. Users rate test cases and/or comment on test cases. If a test case is a good quality test case, case center 214 stores the test case in case repository 206 and the test case is available for use as a good quality test case. If the test case is not a good quality test case, users edit the test case and resubmit the test case for testing. If the test case is a high quality test case, case center 214 stores the test case in knowledge base 224, where users have access to high quality test cases in knowledge base 224. If the test case is not a high quality test case, the test case remains available in case repository 206.

At 504, cloud controller 228 allocates cloud resources, including virtual machines, in cloud network 210. At 506, cloud controller 228 deploys at least one testing environment, such as testing environment 238, to each allocated virtual machine cloud unit in cloud network 210. Cloud controller 228 can deploy multiple testing environments in parallel to different cloud units. Also, if the customer wants to test the software product on multiple platforms, cloud controller 228 deploys different testing environments to at least two of the virtual machines in cloud network 210. Cloud controller 228 and machine center 230 dynamically balance test cases to different virtual machines, where test cases are divided among virtual machines and the software product is tested in parallel, as opposed to serially. At 508, the software product is tested and at 510, report center 216 produces a report.

FIG. 7 is a chart illustrating the advantages of one embodiment of system 20 and vendor computing environment 200. In this example, the customer wants to deploy a software product on three operating systems (OS), using two browsers, and four databases, which is a total of 24 different testing environments. At 600, in serial testing of 200 test cases in one testing environment of the 24 testing environments, deployment time is 2 hours or 120 minutes and test execution time is 5 hours or 300 minutes. At 602, in TaaS testing of the 200 test cases and using four virtual machines, it was found that deployment time dropped to about 30 minutes and test execution time dropped to 75 minutes, with testing of all 24 testing environments.

Testing software products in parallel using virtual machines reduces test execution time. Also, deploying multiple testing environments in parallel reduces deployment time and deploying different testing environments expands platform coverage.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system, comprising:
a vendor computer system including a processor, memory, and other storage media to provide:
a test controller to provide a central access point to the vendor computer system and to manage test cases, the central access point to provide users in a working group different levels of access to the test cases, wherein multiple users in the working group are provided access to editing a group of the test cases, the test controller including:
a reporting center configured to collect information on testing and provide information about test case coverage and exception testing; and
a resource controller to control testing of software products, wherein the resource controller allocates cloud resources in a cloud network to test the software products via the test cases, the resource controller including a queuing system comprising:
a test case queue that stores test cases to be executed, wherein each of the allocated cloud resources retrieves the next test case in the test case queue and returns test results; and
a test result queue that stores the returned test results.

2. The system of claim 1, wherein the resource controller dynamically allocates virtual machines in the cloud network for testing the software products based on the number of test cases to be executed and the number of virtual machines available.

3. The system of claim 1, wherein the resource controller deploys testing environments to virtual machines in the cloud network.

4. The system of claim 1, wherein the resource controller deploys different testing environments to at least two virtual machines in the cloud network.

5. The system of claim 1, wherein the test controller is to manage customer ratings of the test cases.

6. The system of claim 1, wherein the test controller provides for writing and editing of the test cases and rating and commenting on the test cases and the test controller stores higher rated test cases in a knowledge base.

7. The system of claim 1, wherein the central access point is to provide the multiple users in the working group access for at least one of using, rating, and commenting on the group of the test cases.

8. The system of claim 1, wherein the test controller includes a reporting center configured to collect information on testing and provide information about test case coverage, successful tests, exception testing, and test failures.

9. A computer readable storage medium storing instructions for controlling a vendor computer system to perform a method comprising:
providing a central access point to the vendor computer system to provide users in a working group different levels of access to test cases, wherein multiple users in the working group are provided access to editing a group of the test cases;
managing the test cases on the vendor computer system;
allocating cloud resources in a cloud network for testing a software product on the cloud network, the allocating cloud resources in the cloud network comprising:
allocating virtual machines in the cloud network based on the number of test cases to be executed;
deploying different testing environments that have at least one of different operating systems, different browsers, or different databases to the cloud resources in the cloud network; and
testing the software product in the different testing environments on the cloud resources via at least one of the test cases.

10. The computer readable storage medium storing instructions for controlling the vendor computer system to perform the method of claim 9, wherein managing test cases comprises:
managing customer ratings of the test cases.

11. The computer readable storage medium storing instructions for controlling the vendor computer system to perform the method of claim 9, wherein deploying different testing environments comprises:
deploying at least one of the different testing environments to a virtual machine in the cloud network.

12. The computer readable storage medium storing instructions for controlling the vendor computer system to perform the method of claim 9, wherein deploying different testing environments comprises:
deploying the different testing environments to at least two virtual machines in the cloud network.

13. The computer readable storage medium storing instructions for controlling the vendor computer system to perform the method of claim 9, wherein:
deploying different testing environments comprises deploying the different testing environments to virtual machines in parallel to reduce deployment time; and
testing the software product comprises testing the software product on the virtual machines in parallel to reduce test execution time.

14. The computer readable storage medium storing instructions for controlling the vendor computer system to perform the method of claim 9, wherein managing test cases comprises:
providing for writing and editing of the test cases;
managing ratings and comments on the test cases;
storing the test cases in a case repository; and
storing higher rated test cases in a knowledge base.

15. The computer readable storage medium storing instructions for controlling the vendor computer system to perform the method of claim 9 and comprising:

assigning the multiple users in the working group access for at least one of using, rating, and commenting on the group of the test cases.

16. A method of testing comprising:

providing access control to test cases in a vendor computing environment;

managing customer ratings of the test cases;

storing first quality rated test cases in a repository in the vendor computing environment;

storing second quality rated test cases in a knowledge base in the repository, wherein the second quality rated test cases are rated higher than the first quality rated test cases;

allocating one or more virtual machines in a cloud network in the vendor computing environment for testing a software product based on the number of test cases to be executed;

deploying at least one testing environment to the one or more virtual machines in the cloud network; and testing the software product on the one or more virtual machines in the cloud network via at least one of the test cases.

17. The method of claim 16, comprising:

providing for writing and editing of the test cases by customers in the vendor computing environment.

18. The method of claim 16, wherein allocating one or more virtual machines comprises:

allocating the one or more virtual machines based on the number of test cases to be executed.

19. The method of claim 16, wherein deploying at least one testing environment comprises:

deploying different testing environments to at least two virtual machines in the cloud network.

20. The method of claim 16, comprising:

collecting information on testing and providing information about at least one of test case coverage and exception testing.

* * * * *